US012722089B2

(12) United States Patent
Clingman et al.

(10) Patent No.: US 12,722,089 B2
(45) Date of Patent: Sep. 1, 2026

(54) METHODS AND SYSTEMS FOR CROSS-PLATFORM MULTIPLAYER SESSION SHARE

(71) Applicant: Sony Interactive Entertainment LLC

(72) Inventors: Dustin S. Clingman, San Mateo, CA (US); Benedikt Neuenfeldt, San Mateo, CA (US); Shinya Yamada, San Mateo, CA (US); Tetsuya Onoda, San Mateo, CA (US); Adil Sherwani, San Mateo, CA (US); Zev Solomon, Tokyo (JP); Masanao Nishikido, San Mateo, CA (US)

(73) Assignee: Sony Interactive Entertainment LLC

( * ) Notice: Subject to any disclaimer, the term of this patent is extended or adjusted under 35 U.S.C. 154(b) by 197 days.

(21) Appl. No.: 18/343,327

(22) Filed: Jun. 28, 2023

(65) Prior Publication Data

US 2025/0001313 A1 Jan. 2, 2025

(51) Int. Cl.
*A63F 13/795* (2014.01)
*A63F 13/35* (2014.01)
*A63F 13/48* (2014.01)

(52) U.S. Cl.
CPC ............ *A63F 13/795* (2014.09); *A63F 13/35* (2014.09); *A63F 13/48* (2014.09)

(58) Field of Classification Search
CPC ........ A63F 13/795; A63F 13/35; A63F 13/48; A63F 13/77; A63F 13/71
See application file for complete search history.

(56) References Cited

U.S. PATENT DOCUMENTS 8,944,917 B2 * 2/2015 Geisner .................. A63F 13/12 463/42
10,135,776 B1 * 11/2018 Brown .................. H04L 63/08
(Continued)

FOREIGN PATENT DOCUMENTS

EP 2537568 A1 12/2012

OTHER PUBLICATIONS

"Cloudbase.gg—Check Where You Can Play Your Favorite Games via Cloud Gaming", Cloudygamer, Available Online at: https://www.reddit.com/r/cloudygamer/comments/t5z85c/cloudbasegg_check_where_you_can_play_your, Dec. 31, 2021, 7 pages.
(Continued)

*Primary Examiner* — Seng H Lim
(74) *Attorney, Agent, or Firm* — Kilpatrick Townsend & Stockton LLP

(57) ABSTRACT

Methods and systems are provided for processing gameplay invitations are provided. The method includes receiving a request from a first player to share gameplay of a game during a session of gameplay with a recipient. The method includes generating, responsive to the request, a share link for sending to the recipient. The share link includes embedded metadata that identifies an application identifier for the game and a session identifier for the session of gameplay by the first player. The share link forwards the recipient to a web user interface (UI) that enables input of a selection of a platform system from which the recipient is to join the session. The input at the web UI redirects to a trigger link that starts a launch invocation of the platform system and passes the game identifier and the session identifier to the platform system to initiate gameplay of the recipient in the session of gameplay of the first player.

20 Claims, 5 Drawing Sheets

(56) References Cited

U.S. PATENT DOCUMENTS

| | | | | |
|---|---|---|---|---|
| 10,625,156 | B2 * | 4/2020 | Sherwani | A63F 13/35 |
| 10,821,357 | B1 | 11/2020 | Rotelli et al. | |
| 10,913,003 | B2 * | 2/2021 | Miura | H04N 21/4781 |
| 11,642,596 | B2 * | 5/2023 | Atli | A63F 13/79 463/42 |
| 2007/0173325 | A1 * | 7/2007 | Shaw | A63F 13/795 463/42 |
| 2008/0242421 | A1 * | 10/2008 | Geisner | A63F 13/75 463/42 |
| 2016/0001187 | A1 * | 1/2016 | Sepulveda | A63F 13/49 463/31 |
| 2017/0333790 | A1 * | 11/2017 | Champy | A63F 13/33 |
| 2018/0200621 | A1 * | 7/2018 | Goss | A63F 13/35 |
| 2018/0290053 | A1 | 10/2018 | Zhang et al. | |
| 2019/0270020 | A1 * | 9/2019 | Miura | A63F 13/533 |
| 2020/0228610 | A1 * | 7/2020 | Fisher | A63F 13/30 |
| 2020/0338456 | A1 * | 10/2020 | Atli | A63F 13/79 |

OTHER PUBLICATIONS

PCT/US2024/028560, “International Search Report and Written Opinion”, Sep. 13, 2024, 12 pages.

* cited by examiner

METHODS AND SYSTEMS FOR CROSS-PLATFORM MULTIPLAYER SESSION SHARE

1. FIELD OF THE DISCLOSURE

The present disclosure relates generally to computer implemented methods used for sharing game play with others.

BACKGROUND

2. Description of the Related Art

The video game industry has seen many changes over the years. Users are now able to play video games using many types of peripherals and computing devices. Sometimes video games are played using a game console, where the game console is responsible for processing the game and generating the interactive input presented on display screens. Other times, video games are played in streaming mode, where a server or servers execute the game remotely and users provide input over a network connected device.

Today, many popular games are designed to be playable across a multitude of platforms, e.g., game consoles, personal computers (PCs), online streaming providers, etc. The ability to play games across many platforms has contributed to making certain games popular among more players. Unfortunately, when one player is playing a game on one platform, inviting friends to share a multi-player gaming session can be difficult or require significant friction to start. By way of example, some cross-platform game invites are only visible and actionable in-game, which limits reach and impact. Some games have different processes for supporting cross-platform experiences. Further, current methods require upfront coordination, making it harder for players to be spontaneous.

It is in this context that implementations of the disclosure arise.

SUMMARY

Implementations of the present disclosure include methods, systems, and devices for enabling players to easily share and join gameplay sessions with friends and communities that leverage preferred modes of communication.

In one embodiment, a method for processing gameplay invitations is provided. The method includes receiving a request from a first player to share gameplay of a game during a session of gameplay with a recipient. The method includes generating, responsive to the request, a share link for sending to the recipient. The share link includes embedded metadata that identifies an application identifier for the game and a session identifier for the session of gameplay by the first player. The share link forwards the recipient to a web user interface (UI) that enables input of a selection of a platform system from which the recipient is to join the session. The input at the web UI redirects to a trigger link that starts a launch invocation of the platform system and passes the game identifier and the session identifier to the platform system to initiate gameplay of the recipient in the session of gameplay of the first player.

In some implementations, the session of gameplay by the first player uses a first platform system and the platform system of the recipient is a second platform system that is different from the first platform system.

In some implementations, the share link is a first universal resource link (URL) that is sent to the recipient using a message. The message identifies the game being played by the first player, and the input of the selection of the platform system at the web URL automatically activates the trigger link that starts the launch invocation of the platform system of the recipient.

In some implementations, the share link is sharable with third parties without restriction to being designated as friends on the first platform or the second platform.

In some implementations, the share link is re-sharable by the recipient or another recipient that receives the share link to join the session of gameplay of the game. The share link maintains said metadata regarding the application identifier for the game and the session identifier for the session of gameplay by the first player.

In some implementations, the session is a multiplayer session.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which.

DETAILED DESCRIPTION

The following implementations of the present disclosure provide methods, systems, and devices for cross-platform sharing of invitations to join a game session. A first user may be playing a game and wish to invite another player to join the game session of the first player in the form of a multiplayer online game. The player being invited need not be a member of the service or platform from which the first player is playing the session. The systems and methods described herein enable generation of a share link that will include metadata usable by the recipient to join the session of the first player, regardless of whether the first player is using the same platform system and regardless if the invited player is a preexisting friend of the first player. With the above overview in mind, the following provides several example figures to facilitate understanding of the example embodiments.

Figure 1:
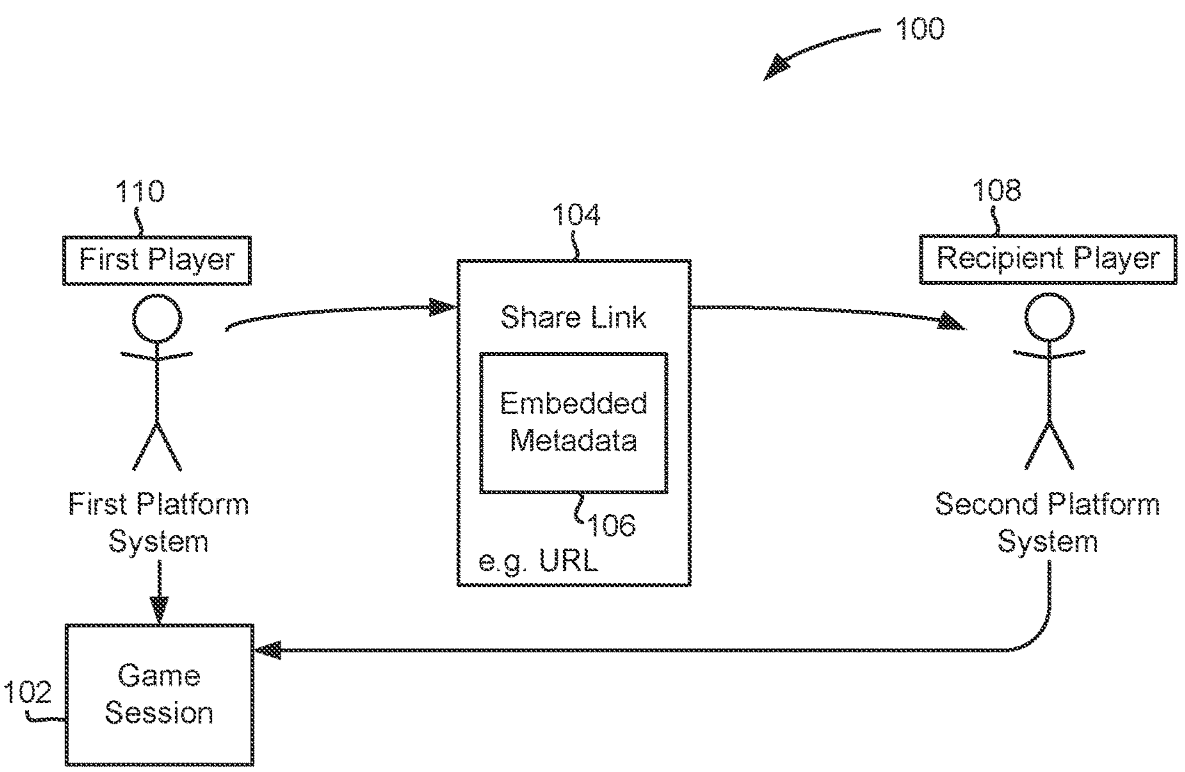
FIG. 1 illustrates an overview diagram of a process for inviting a player to play an online multiplayer game, where the first player that sends the invitation is playing a game on a platform that is distinct from the platform of the first player.

FIG. 1 illustrates an overview diagram 100 of a process for inviting a player to play an online multiplayer game, where the first player that sends the invitation is playing a game on a platform that is distinct from the platform of the first player. By way of example, the first player may be playing a game using a game console, e.g., Sony™ PlayStation™ and the invited player usually plays a game using a personal computer (PC). In this case, the Sony PlayStation console is a platform system that is distinct from the PC. A Microsoft™ Xbox™ console is also an example of a platform system that is distinct from the Sony™ PlayStation™ console and the PC. These distinct platform systems have proprietary technology, different hardware and configurations, but still, all are usually able to commonly play certain game titles. Commonly, game studios that produce games make it possible to play their games more than more platform systems. Unfortunately, invitation of other players to play an online multiplayer game requires the inviter and the invitee to be on the same platform and also be registered as friends in that platform. These limitations are significant, in that players wishing to play a game with a friend that is not part of their platform will find technical and logistical difficulties.

In one embodiment, the first player 110 may be playing a game using a first platform system. The first platform system, in one example, may be a PlayStation game console, or some other console or platform. By way of example, the game being played by the first player 110 may be an online game, which is executed using the first platform system but in online coordination with a game server to enable multiplayer mode. Generally speaking, multiplayer mode gameplay allows two or more players to play a game and share interactivity in the game, even while each instance of the game is being executed at the local platform system. The game server is responsible for enabling the multiplayer game mode, coordinating game state between the players of the game, and allowing two or more players to join a session. In this example, the first player 110, playing a game using the first platform system, will be associated with a game session 102. The game session 102 is the session where the first player 110 is engaged in gameplay.

In one embodiment, the first player 110, in the multiplayer mode, may also be playing with other players in the same game session 102. In one embodiment, the first player 110 may wish to invite a second player to join the game session 102. In this example, the second player may be referred to as a recipient player 108, or the recipient 108 that is being invited by the first player 110.

In one embodiment, the first player 110 utilizing the first platform system may utilize, and select from a user interface to share a link to allow the recipient player 108 to join a group session. In this example, the link is a share link 104, which includes embedded metadata 106 that can be messaged to the recipient player 108 to initiate the share of the game session with the recipient player 108. The recipient player 108 may or may not be playing a game utilizing the second platform system that the recipient player 108 utilizes for gameplay. Thus, the message may be sent to the recipient player 108 as a simple text message, and if the recipient player 108 accepts to play and join the session 102, and embodiment allows for the acceptance to invoke startup of the second platform system for the recipient player 108.

In one embodiment, the recipient player 108 does not need to be on the same platform as the first player 110, and therefore the invitation of the share link 104 will allow for the recipient player 108 to join the game session 102 regardless of platform and regardless of whether the recipient player 108 is a friend of the first player 110 on the first platform system. The share link 104, in one embodiment is generated by share link generator logic that enables the embedding of metadata 106 in the share link 104. In this manner, when the first player 110 sends the invitation of a share link 104 to the recipient player 108, the embedded metadata 106 will include at least information related to the application identifier and a session identifier for the game session 102. The embedded metadata 106, in one embodiment, can be generated using share link generator logic that is executed at the first platform system where the first player 110 is playing. The embedded metadata 106 can be presented to the first player 110 in the form of a URL.

The URL can be presented, for example, on the display screen where the game session 102 is being played by the first player 110. The first player 110 can then capture the URL using a mobile device. Using the mobile device, the first player 110 can then select a recipient, utilizing any social application using the mobile device, and send the share link 104 to the recipient player 108. Once the recipient player 108 receives the invitation, a web user interface (UI) will ask the recipient 108 what platform they wish to play on if they accept the invitation. The recipient player, once accepting the invitation and selecting the platform they wish to play on, is redirected to a URL that will launch the game on their selected platform utilizing the session ID and parameters passed utilizing the share link 104. In one embodiment, the use of the URL is referred to as a URL-based game launch, which is supported by various platforms. At this point, the game will use the session ID parameter to add the joining player (recipient player 108) to the same session 102 as the sender (first player 110). In some embodiments, game telemetry insights can be obtained and presented to invited users. Some of this information can include, e.g., for example, platform joins (e.g., number of aggregate shares and joins). Further APIs can be used to offer URLs directly to games for optional display in game and game app UX.

In some embodiments, parts of the shareable session functionality may be handled within the game. Furthermore, the shareable session functionality creates a space for impromptu play that doesn't require premeditated or planned play. For example, the share session functionality does not require a player to already be playing the game which enables the impromptu invites to take place outside of the game console/device.

Figure 2:
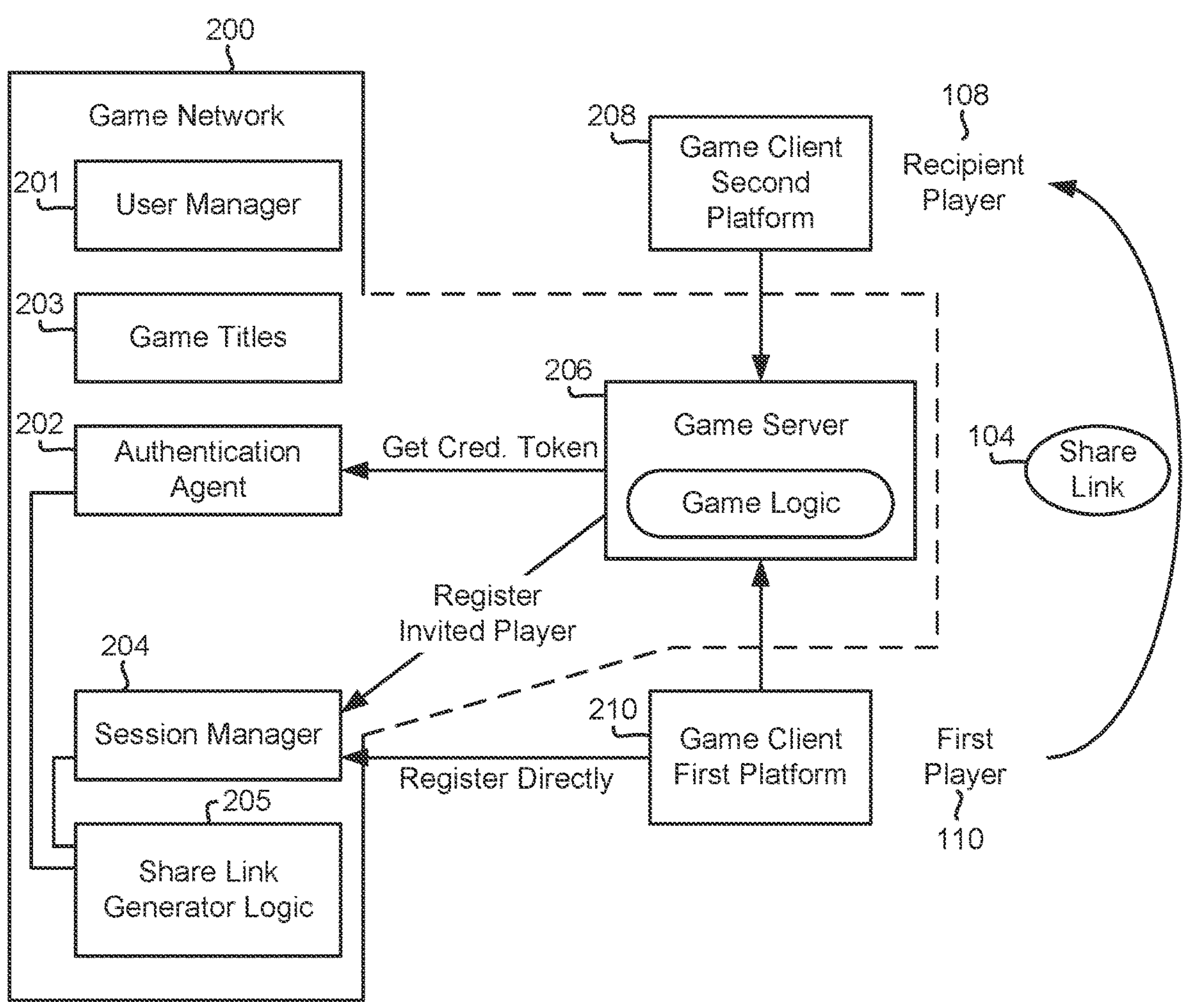
FIG. 2 illustrates an overview diagram representing one embodiment where a first player invites a recipient player to join the game session of the first player.

FIG. 2 illustrates an overview diagram representing one embodiment where a first player 110 invites a recipient player 108 to join the game session of the first player 110. In one embodiment, a game network 200 may represent an online gaming service that allows users registered with the game network 200 to access games for online gaming. In one broad example, the game network 200 may include a user manager 201, that serves to authenticate registered users of the game network, manage profiles for the users, manage game assets for the users, and associate game titles purchased and/or used by the users of the game network 200. Game network 200 may also include logic for managing game titles 203, that may be accessed by users of the game network 200.

In one embodiment, the game titles represent the games that developers have enabled for use by the game network 200. In one configuration, developers of the game titles will program logic or code into their games to allow for cross-platform invites of their games. In one embodiment, share link generator logic 205 of the game network 200 will include code that understands when game titles 203 will allow for cross-platform invitations, and assists in generating share links.

As shown, the share link generator logic 205 communicates with the session manager 204 in order to capture the session ID for inclusion in the metadata of the share link 104. The share link generation logic 205 is also configured to identify the application ID of the game that the first player 110 is requesting to share. On one configuration, the game title developer for the game is configured to code data to accept session sharing with "anyone" that receives the share link, responsive to a share session invitation. Game developers are able to register in game network 200 other platform title identifiers and boot deep links in development kits (DevNet).

The game, i.e., game engine and game logic is executed by the first platform 210 and other platforms that joint to play the game (e.g., responsive to joining via the share link by cross-platform users, or internal joining if by other users that use the same platform). The game server 206 is configured to execute game logic for managing online play of the game title executed on the platform or platforms in multiplayer mode.

The game network 200 may include an authentication agent 202 and a session manager 204, that manages sessions that are played by users of the game network 200. In one configuration, the game client of the first platform 210 may be registered with the game network 200. In one example, the game network 200 may be an online gaining network managed by Sony™ PlayStation™ for online gaming. The first platform 210 may be a PlayStation game console. Without limitation, the PlayStation game console may be any generation of game consoles that are capable of processing the game title and engaging in the generation of a share link.

In this example, a game client of the first platform 210 may register directly with the session manager of the game network 200, since the first platform is part of the game network 200. The second platform for another game client 208 may not be registered with the game network 200, and may be of a different type of platform. By way of example, the second game client of the second platform 208 may be a personal computer (PC) utilized by a recipient player 108 to play games. As mentioned above, the recipient player 108 may or may not be playing a game when the first player 110 shares a link 104 with the recipient player 108. If the recipient player 108 accepts the invitation, the recipient 108 may click on the URL received via the share link 104.

A web UI then asks the recipient 108 if the recipient 108 wishes to play with the first player 110, responsive to the share link 104. This would be an invitation that allows the recipient 108 to select the platform in which the player 108 desires to play with first player 110, assuming that the invitation is accepted and/or the recipient player 108 is available to play and join the game session 102 of the first player 110. The web UI will then redirect the recipient 108 to a platform specific URL that invokes the game launch at the second platform 208. The launch URL will include a session ID as a parameter to be passed to the game. In this example, a game server 206 is managing the game session 102 utilizing game logic. The game logic enables the first platform 110 to utilize the multiplayer mode processing of the game server 206, to therefore share game state and multiplayer interactivity with another player also connected to the game server 206. In this example, the share link 104 was shared with recipient player 108.

Since the recipient player 108 is ready to play, the launch URL, utilizing the session ID will cause the second platform to launch the game. The game uses the session ID parameter to add the joining player to the same session as the center. In this example, the game server 206 that receives the request to join from the game client of the second platform 208, will get a credential token from an authentication agent 202. The credential token will then be used by the session manager to register the invited player to the game session 102. In one embodiment, APIs can be used to enable the communication to get credentials and register/add the players to sessions. At this point, the recipient player 108 can join the game session 102 of the first player 110, regardless of the type of platform utilized by the recipient player 108 and regardless of whether the recipient player 108 is a friend of the first player in the game network 200. In one embodiment, the game title will include structure code that will enable authorization of cross-platform sessions.

Figure 3:
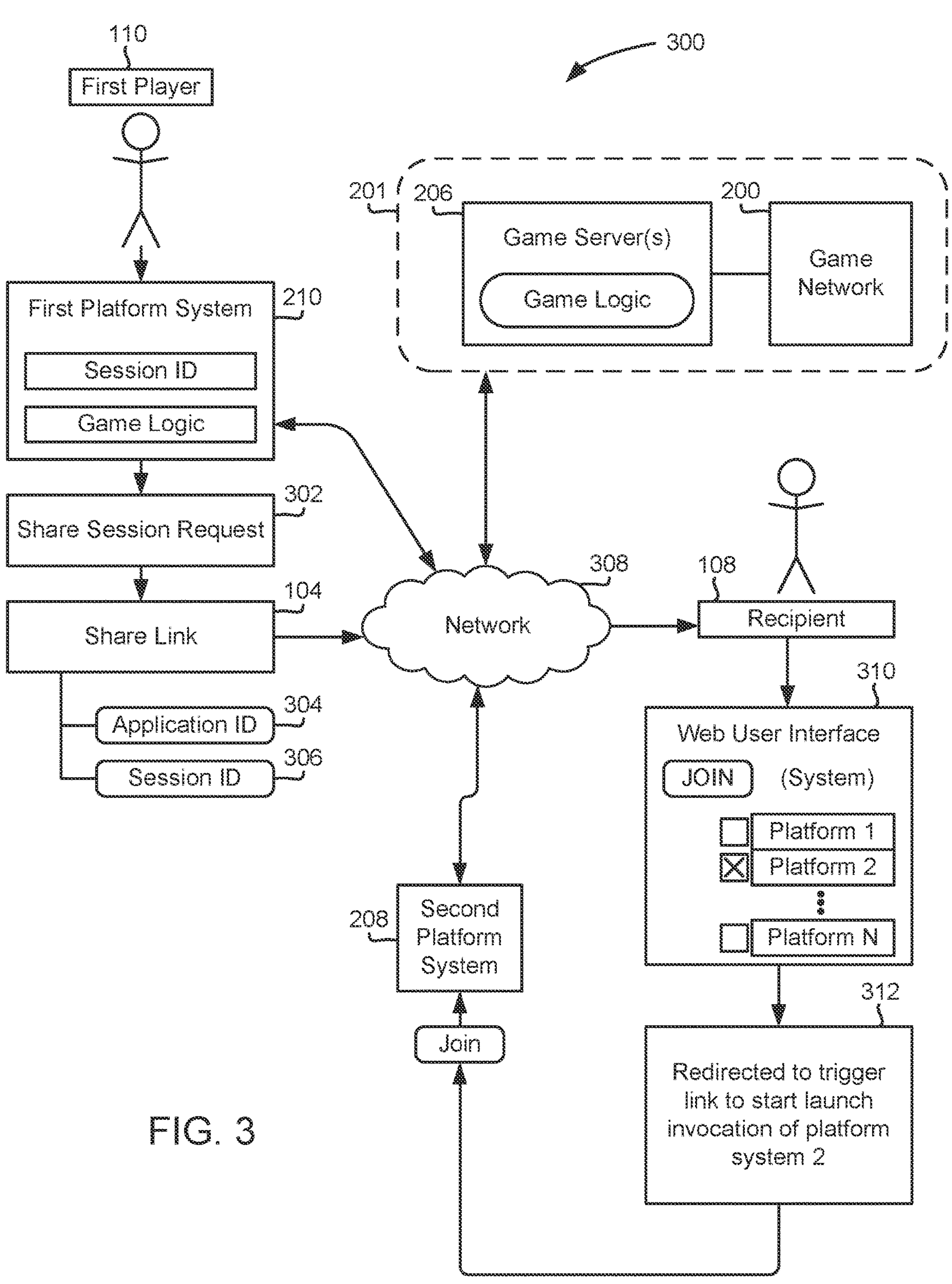
FIG. 3 illustrates a flow chart diagram showing example operations performed to enable sharing a link with a recipient to join a cross-platform session, in accordance with one embodiment.

For example, the code can be set so that anyone can join the session and joining the session can be enabled via a cross-platform system (i.e., different computing system and/or service). FIG. 3 illustrates a flow chart diagram of showing that the example operations performed to enable sharing a link with a recipient to join a cross-platform session, in accordance with one embodiment. In this example, the first player 110 may be playing a game having game logic using first platform system 210. The game will have an associated session ID that is known by game server 206 via access to the game network 200. The game server 206, and one embodiment, is one of a plurality of servers that are managed by the game network 200. In one configuration, game servers are typically managed in the form of data centers, which enable registered users to access multiplayer games, share game sessions, and engage in a multiplayer interactivity with other players that are registered and/or have accounts with the game network 200.

In one embodiment, the share link 104 enables a first player 110 that has an account with the game network 200 to invite any recipient to join their gaming session using the same or different platform system. As mentioned above, the game titles will be coded to enable access by players from other platform systems, and will not restrict access to sessions when recipients are registered to use the game network 200. In operation 302, the first player 110 may request to share a session in which they are playing a game, with another player. Responsive to the request, the share link 104 is generated for the session ID in which the first player 110 is engaged on using the first platform system. The share link 104 can then be sent over a network to a recipient 108. As mentioned above, one configuration can enable sharing the link using any communication tool.

One communication tool can be a social communication application, such as a messaging app, a gaming app, text messages, email communications, peer-to-peer communications, and/or any other communication that can be sent to the recipient or other recipients over a network 308, e.g. the Internet. As shown, the share link 104 will be associated with an application ID 304 and a session ID 306. The application ID 304 will identify the game title that the first player 110 is engaged in using the first platform system 210.

The application ID 304 and the session ID 306 is metadata that is integrated with the share link 104. The share link 104 may be generated using a user interface that provides for sharing capabilities using the first platform system. The recipient 108 will then receive the message, text, or social app communication providing the invitation to play a game with the first player 110. The receipt of the message by the recipient 108 may be using their phone or computer or console. The share link 104 will enable the recipient 108 who wishes to utilize the link to join the game session as shown in operation 310. The user interface can include a selection menu of types of platforms that the recipient 108 can select for playing the game and joining the session with the first player 110. In this example, platform system 2 is selected and the join button may be selected by the recipient 108. In alternative embodiments, the recipient's preferred platform may be automatically identified from other online sources or registrations by the recipient 108. In that case, the Web UI may simply ask if the user wishes to join on their system, which may be automatically identified as, e.g., Steam platform.

In operation 312, the recipient 108 is redirected to a trigger link that starts a launch invocation of the platform system 2. In one embodiment, the recipient 108 will have a platform system that was selected (manually or automatically), and the game title is launched using the application ID and the session ID parameter received from the share link 104.

Recipient 108 can then join the session of the first player 110 utilizing the second platform system 208. Again, the recipient 108 need not be a registered user of the first platform system and the recipient 108 can utilize his or her own platform system that may be different from the first platform system. In one specific example, the first player 110 may be utilizing a Sony™ PlayStation 5™ game console, and the recipient 108 may not be a registered user with the game network 200 managed by Sony™ PlayStation™. The recipient 108 may be a registered user of the Microsoft™ Xbox™ network, or a personal computer user registered with another service, such as Steam™ by Valve Corporation.

Figure 4:
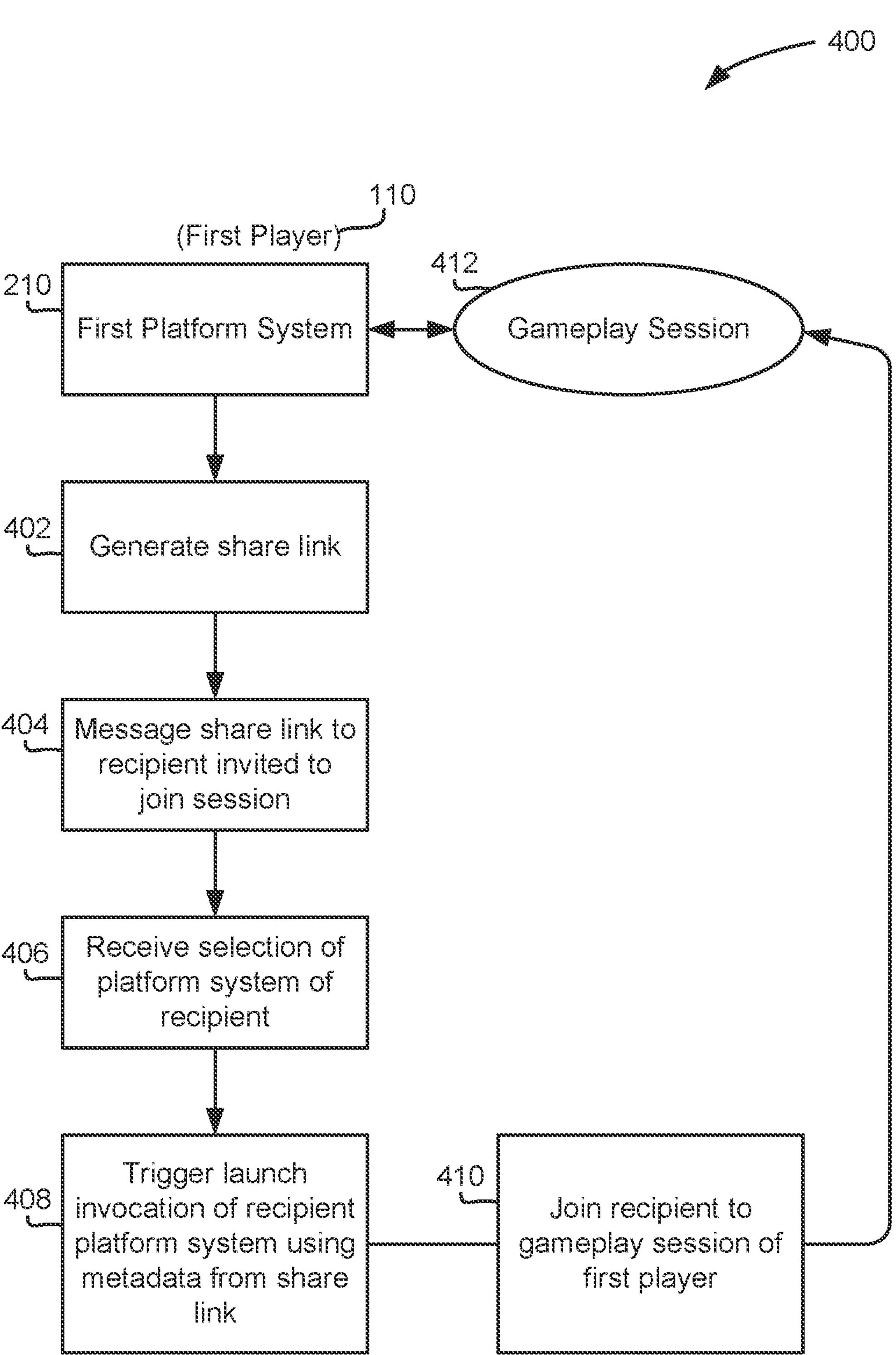
FIG. 4 illustrates another example flow diagram associated with a first player inviting a recipient to join a session, by messaging a share link to the recipient, in accordance with one embodiment.

FIG. 4 illustrates another example flow diagram associated with a first player inviting a recipient to join a session, by messaging a share link to the recipient. In operation 210, the first player 110 may be engaged in gameplay for a game using first platform system 210. At some point during, before or after the beginning of the gameplay, the first player 110 may decide to send a share link 104 to a recipient. Utilizing a user interface provided by the first platform system 210, the first player 110 may select "share link" to access a cross-platform linkage.

Responsive to this selection to start a group session, the share link would generate a QR code that is displayed that can be scanned with the mobile device booting in a web or a PlayStation™ app flow. The QR code may provide information such as "share this invite with anyone," by scanning the QR code with your mobile device and then following the on-screen instructions. The first player is also instructed that they can invite players on other platforms by sending them a URL at a specific address. Using the mobile device of the first player 110, the first player 110 may select to invite the recipient to a game by posting a session URL link utilizing a standard mobile operating system share option.

The sharing can also be done within a PlayStation™ app (application), or an iOS or android share sheet. The iOS or android composer can then be utilized to send the link to the recipient 108 or other recipients. In some embodiments, the same link can be resent to other recipients to join a game by simply sharing the share link 104. In some embodiments, the number of players to conjoin a session can be limited. For example, some games there is a limit of five players, a player, nine players, or any number of players depending on the context and specifics of the particular game. In some embodiments, the share link can also identify already existing multi-players that have joined the session, to provide new potential joining recipient's information as to the players and whether that new recipient wishes to join the session.

In operation 404, a message to share the link to the recipient is sent so that the invited recipient can join the session. In some embodiments, joining a session can be performed via an integrated social network. For example, a sharing interface can be presented using widgets that display via an iFrame on message surfaces. In this configuration, a session widget can update to provide status as well as process the joining of the session flow. Other joining flows may be via mobile device (e.g., using installed apps) or web flows (e.g., using a browser).

In operation 406, selection of a platform system by the recipient is received. For example, the recipient can identify that they wish to join utilizing a PC that has an account with Steam™ by Valve Corporation (or some other service/platform). In operation 408, launch invocation is triggered for the recipient's platform system utilizing metadata in the shared link. The metadata includes at least application ID and the session ID. In operation 410, the recipient is joined to the gameplay session of the first player. The recipient is now engaged in game play session for twelve, wherein the first player and the recipient are engaged in gameplay in the same session.

In some embodiments, operation 406 may include logic for determining the platform system of the recipient automatically. For example, if the recipient is a registered user of a specific game platform, that information may be obtained over a network or from a social network. Utilizing this information, the share link message sent to the recipient will be easier to navigate by the recipient, since the recipient just has to agree to play and join the session of the inviting player.

In still another embodiment, passwords may be utilized when sending share links 104 to specific players. In another embodiment, restrictions may be placed on re-sharing of the link by other than the initial first player to a specific recipient. In some embodiments, the first player 110 may send out multiple share links to a group of players to initiate a multi-user game experience in a cross-platform environment. All of these functionalities beneficially reduce the friction associated with joining a game session of another player, and removing the complexities of being previously registered friends, or having the identical platform system.

Figure 5:
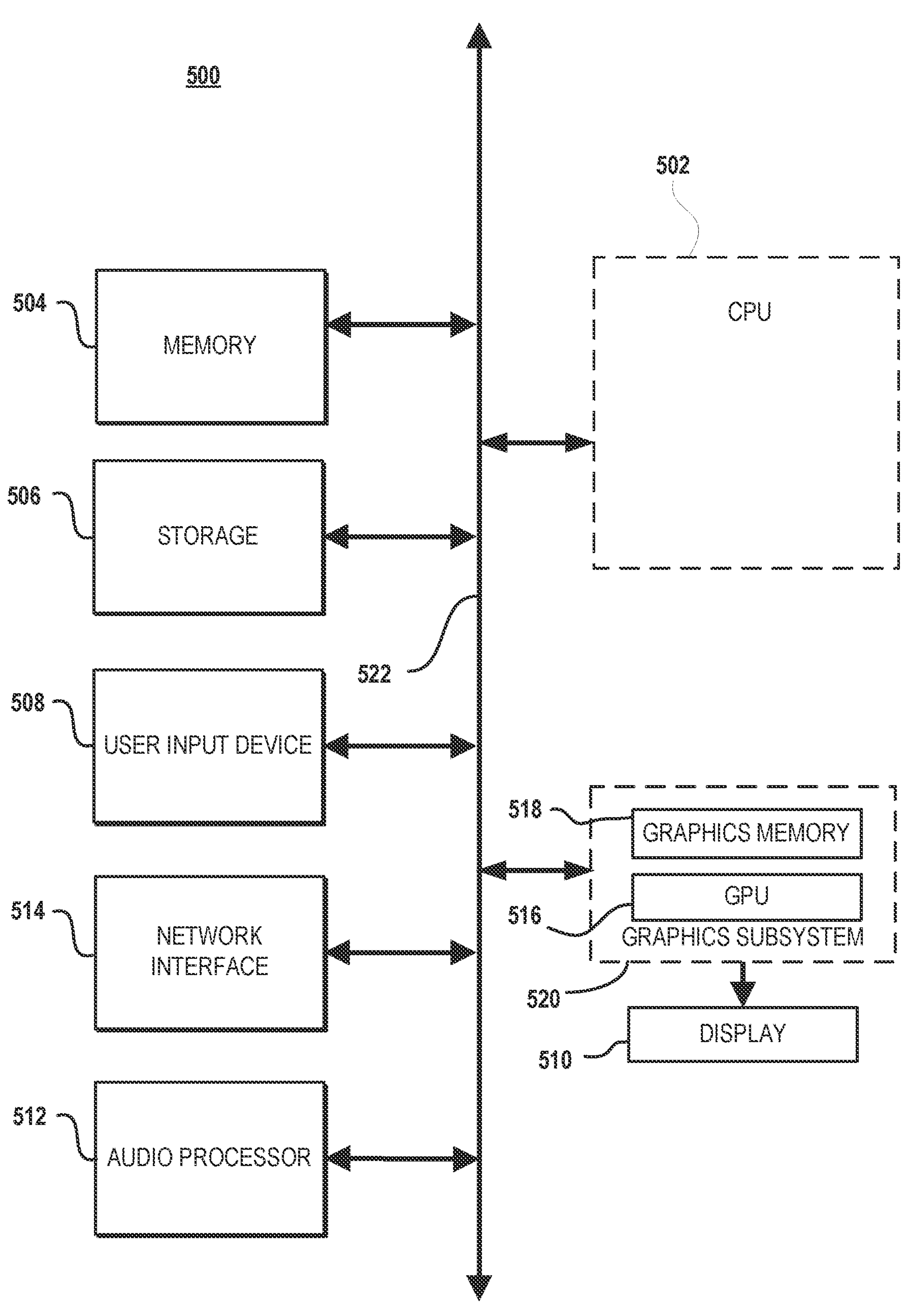
FIG. 5 illustrates components of an example device and/or platform system that can be used to perform aspects of the various embodiments of the present disclosure.

FIG. 5 illustrates components of an example device 500 that can be used to perform aspects of the various embodiments of the present disclosure. This block diagram illustrates a device 500 that can incorporate or can be a personal computer, video game console, personal digital assistant, a server or other digital device, suitable for practicing an embodiment of the disclosure. Device 500 includes a central processing unit (CPU) 502 for running software applications and optionally an operating system. CPU 502 may be comprised of one or more homogeneous or heterogeneous processing cores. For example, CPU 502 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 500 may be localized to a player playing a game segment (e.g., game console), or remote from the player (e.g., backend server processor), or one of many servers using virtualization in a game cloud system for remote streaming of gameplay to clients.

Memory 504 stores applications and data for use by the CPU 502. Storage 506 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 508 communicate user inputs from one or more users to device 500, examples of which may include keyboards, mice, joysticks, touch pads, touch screens, still or video recorders/cameras, tracking devices for recognizing gestures, and/or microphones. Network interface 514 allows device 500 to communicate with other computer systems via an electronic communications network, and may include wired or wireless communication over local area networks and wide area networks such as the internet. An audio processor 512 is adapted to generate analog or digital audio output from instructions and/or data provided by the CPU 502, memory 504, and/or storage 506. The components of device 500, including CPU 502, memory 504, data storage 506, user input devices 508, network interface 510, and audio processor 512 are connected via one or more data buses 522.

A graphics subsystem 520 is further connected with data bus 522 and the components of the device 500. The graphics subsystem 520 includes a graphics processing unit (GPU) 516 and graphics memory 518. Graphics memory 518 includes a display memory (e.g., a frame buffer) used for storing pixel data for each pixel of an output image. Graphics memory 518 can be integrated in the same device as GPU 508, connected as a separate device with GPU 516, and/or implemented within memory 504. Pixel data can be provided to graphics memory 518 directly from the CPU 502. Alternatively, CPU 502 provides the GPU 516 with data and/or instructions defining the desired output images, from which the GPU 516 generates the pixel data of one or more output images. The data and/or instructions defining the desired output images can be stored in memory 504 and/or graphics memory 518. In one embodiment, the GPU 516 includes 3D rendering capabilities for generating pixel data for output images from instructions and data defining the geometry, lighting, shading, texturing, motion, and/or camera parameters for a scene. The GPU 516 can further include one or more programmable execution units capable of executing shader programs.

The graphics subsystem 514 periodically outputs pixel data for an image from graphics memory 518 to be displayed on display device 510. Display device 510 can be any device capable of displaying visual information in response to a signal from the device 500, including CRT, LCD, plasma, and OLED displays. Device 500 can provide the display device 510 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (Saas). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experience. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as HTML, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction.

During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method for processing gameplay invitations, comprising:

receiving an indication of a request for a first player device to share gameplay of a game during a session of gameplay with a recipient device; and generating, responsive to the request, a share link for sending to the recipient device, the share link including embedded metadata that identifies an application identifier for the game and a session identifier for the session of gameplay by the first player device;

wherein the share link comprises a system type-agnostic universal resource link that is invariant with respect to different system types and different recipients and the recipient device causes presentation of a network-served web user interface that enables input of a selection of a system type from a plurality of heterogeneous system types from which the recipient device is to join the session; and responsive to the input, redirecting to a system type-specific trigger link that starts a launch invocation of the selected system type and passes the application identifier and the session identifier to initiate gameplay for the recipient device in the session of gameplay.

2. The method of claim 1, wherein the session of gameplay by the first player device uses a first system type and the system type of the recipient device is a second system type that is different from the first system type.

3. The method of claim 2, wherein the share link is sharable with third parties without restriction to being designated as friends on the first system type or the second system type.

4. The method of claim 1, wherein the share link is re-sharable by the recipient device or another device that receives the share link to join the session of gameplay of the game, wherein the share link maintains the metadata regarding the application identifier for the game and the session identifier for the session of gameplay by the first player device.

5. The method of claim 1, wherein the session is a multiplayer session.

6. The method of claim 1, wherein the indication of the request is received via a user interface of a first system type used by the first player device, the request is configured to generate a code that can be visually detected by a mobile device for sending to the recipient device via a message transmitted using the mobile device.

7. The method of claim 1, wherein the system type is automatically selected for the recipient device based on a user profile associated with the recipient device.

8. The method of claim 1, wherein a message is used to send the share link, the share link identifies telemetry insight data regarding players active in the session, the session being a multiplayer session.

9. The method of claim 1, wherein the application identifier is associated with coded system type options that identify a set of system types the game enables using the share link, wherein a backend system of a first system type used by a first player has the game registered with the application identifier.

10. The method of claim 1, wherein the launch invocation is a URL-based game launch.

11. The method of claim 1, wherein a game server executing the game is configured to receive the request from the first player device to share the gameplay of the game during the session, the game server is configured to get a credentials token responsive to an indication received by the recipient device that the share link was selected and a session manager is configured to associate the recipient device with the session using the credentials token.

12. The method of claim 1, wherein the web user interface displays, prior to the selection, real time session metadata identifying current participants and available capacity for the session.

13. The method of claim 1, wherein the system type-specific trigger link is a signed, single use link that expires after a predefined time interval.

14. A system for processing gameplay invitations, the system including one or more servers for executing online multi-player gaming, comprising:

a server receiving an indication of a request for a first player device to share gameplay of a game during a session of gameplay with a recipient device; and the server generating a share link for sending to the recipient device, the share link including embedded metadata that identifies an application identifier for the game and a session identifier for the session of gameplay by the first player device;

wherein the share link comprises a system type-agnostic universal resource link that is invariant with respect to different system types and different recipients and, when selected on the recipient device, causes presentation of a network-served web user interface that enables input of a selection of a system type from a plurality of heterogeneous system types from which the recipient device is to join the session; and wherein the server, responsive to the input at the web user interface, redirects to a system type-specific trigger link that that starts a launch invocation of the selected system type and passes the application identifier and the session identifier to initiate gameplay for the recipient device in the session of gameplay.

15. The system of claim 14, wherein the session of gameplay by the first player device uses a first system type and the system type of the recipient device is a second system type that is different from the first system type.

16. The system of claim 14, wherein the indication of the request is received via a user interface of a first system type used by the first player device, the request is configured to generate a code that can be visually detected by a mobile device for sending to the recipient device via a message transmitted using the mobile device.

17. The system of claim 14, wherein the system type is automatically selected for the recipient device based on a user profile associated with the recipient device.

18. The system of claim 14, wherein a message is used to send the share link, the share link identifies telemetry insight data regarding players active in the session, the session being a multiplayer session.

19. The system of claim 14, wherein the server is associated with a game server executing the game for the first player device and is configured to receive the request from the first player device to share the gameplay of the game during the session, the game server is configured to get a credentials token responsive to an indication received by the recipient device that the share link was selected and a session manager is configured to associate the recipient device with the session using the credentials token.

20. The system of claim 14, wherein the server hosts a landing page reachable via the universal resource link, the landing page listing at least three heterogeneous system types and, responsive to recipient selection, constructing the system type-specific trigger link that passes the application identifier and the session identifier.

* * * * *